United States Patent [19]

Kolditz

[11] Patent Number: 5,087,410
[45] Date of Patent: Feb. 11, 1992

[54] METHOD OF AVOIDING LOCALIZED HYDROGEN BUILD-UPS IN SAFETY TANKS OF REACTORS

[75] Inventor: Joachim Kolditz, Talheim, Fed. Rep. of Germany

[73] Assignee: Gemeinschaftskernkraft Neckar GmbH (GKN), Neckarwestheim, Fed. Rep. of Germany

[21] Appl. No.: 572,855

[22] Filed: Aug. 24, 1990

[30] Foreign Application Priority Data

Aug. 24, 1989 [DE] Fed. Rep. of Germany ....... 3927959

[51] Int. Cl.$^5$ .............................. G21C 13/04
[52] U.S. Cl. .................. 376/298; 376/277; 376/300
[58] Field of Search ............ 376/277, 300, 308, 298, 376/299

[56] References Cited

U.S. PATENT DOCUMENTS 4,193,338 3/1980 Smiltnieks et al. ............... 376/308
4,631,164 12/1986 Heck ................... 376/300

FOREIGN PATENT DOCUMENTS 2805476 8/1979 Fed. Rep. of Germany .

OTHER PUBLICATIONS

Kenneth C. Lish; *Nuclear Power Plant Systems and Equipment;* 1972; Section 2.6.2 and 14.4.

Primary Examiner—Brooks H. Hunt
Assistant Examiner—Frederick H. Voss
Attorney, Agent, or Firm—Robert W. Becker & Associates

[57] ABSTRACT

A method of avoiding localized hydrogen build-ups in the atmospheres of safety tanks of reactors, especially light water reactors, is provided. After a break down that is accompanied by loss of coolant has occurred, the cooling water temperature in the sump of the safety tank is adjusted in the phase of the long term cooling to a temperature that is high than the air temperature in the dome of the safety tank, with this temperature adjustment being effected in such a way that an adequate intermixing of the atmosphere in said safety tank is effective in a convective manner.

4 Claims, No Drawings

METHOD OF AVOIDING LOCALIZED HYDROGEN BUILD-UPS IN SAFETY TANKS OF REACTORS

BACKGROUND OF THE INVENTION

The present invention relates to a method of avoiding localized hydrogen build-ups in the atmosphere of safety tanks of reactors, especially light water reactors.

After a breakdown or the like that is accompanied by the loss of coolant, hydrogen forms in the core primarily due to radiolysis. The hydrogen escapes at the break or rupture in the primary circuit, and mixes with the oxygen-containing atmosphere. Consequently, ignitable hydrogen/oxygen mixtures can result in localized regions of the safety tank, for example in the vicinity of the break.

In order when breakdown of the coolant flow occurs to be able to break up or dissipate such ignitable hydrogen build-ups, it is known to disturb the density equilibrium in such localized atmospheres that are disposed in superimposed layers in the safety tank. In particular, the atmospheres are disturbed by providing within or externally of the safety tank circulating fans and/or recombinators that by means of forced air flows intermix the different atmosphere layers that are in equilibrium with one another, and thereby break up localize d hydrogen build-ups. Unfortunately, these known methods are relatively complex and expensive since they require large fans that have their own supply of power and for which special measures must in addition be provided to protect against breakdown.

Pursuant to another known method (DE-OS 28 05 476), the drawbacks associated with the use of fans and/or recombinators, where the free hydrogen is oxidized, for example by catalytic combustion with oxygen, are avoided in that the localized build-ups of hydrogen that result in the safety tank after a breakdown as a consequence of superimposed atmosphere layers that are in equilibrium with one another are again broken up by effecting in a specific portion of one such atmosphere layer a localized change of the density, for example by introducing into this locally limited atmosphere region a gas having a different density, preferably helium, so that due to the change in density brought about in this manner, this atmosphere layer locally undergoes a vertically directed acceleration that generates a convection.

Unfortunately, this method also has a drawback, namely that in order to be able to carry it out relatively expensive apparatus are required, for example special conduits that must be disposed at different levels and must lead to different areas within the safety tank in order if a breakdown occurs to be able to carry out a precise introduction of the gas or a planned localized change of the temperature in this atmosphere region. Such conduits for the localized changing of the density via the supply of a gas to the pertaining region of the safety tank must communicate with sources of gas, for example an appropriate number of gas tanks in which the gas is under great pressure or exists in a liquid state, with these sources of gas being disposed externally of the safety tank. The ga tanks themselves require special handling and monitoring. Furthermore, a precise monitoring of the atmosphere in the safety tank is necessary in order to be able to detect and break up localized build-ups.

It is therefore an object of the present invention to provide a method that avoids the aforementioned drawbacks of the known methods, is easy to carry out, and above all, in contrast to the known methods described above, right from the beginning avoids the formation of ignitable hydrogen/oxygen mixtures due to build-up in localized regions of the safety tank of a nuclear reactor.

This object, and other objects and advantages of the present invention will appear more clearly from the following specification.

SUMMARY OF THE INVENTION

The method of the present invention is characterized primarily in that after a breakdown accompanied by loss of coolant has occurred, the cooling water temperature in the sump of the safety tank in the phase of the long term cooling is adjusted to a temperature that is higher than the air temperature in the dome of the safety tank, with the temperature adjustment being effected in such a way that an adequate intermixing of the atmosphere in the safety tank is effected in a convective manner.

In particular, the inventive intermixing can be effected by the following alternative measures. or by a combination thereof:

a) The required temperature level in the sump of the safety tank is adjusted as a function of the air temperature in the dome of the safety tank via the operation of redundant after-cooler systems;

b) The temperature in the sump of the safety tank is additionally adjusted by regulating the reheating cooler; and c) To achieve the required sump temperature, the secondary heat of the reactor, which is continuously dissipated during the adjusted temperature level of the sump water, is utilized.

Due to the fact that the cooling water temperature in the sump of the safety tank is regulated in such a way that this temperature is higher than the temperature of the air in the dome of the safety tank, the air disposed at the bottom of the safety tank moves to the upper regions of the safety tank as a consequence of natural drafts, in other words in a convective manner. Thus, in the entire safety tank a continuous, intensive air circulation occurs that does not even allow a layer formation of the atmosphere in the safety tank, including the formation of inversion layers, to occur. Thus, with the inventive method the cause for the formation of the feared localized gas concentrations is eliminated right from the start, so that it is no longer necessary to provide special means for a subsequent break-up of such localized gas concentrations in superimposed layered atmospheres.

Further specific details of the inventive method will be described subsequently.

When breakdowns occur that are accompanied by loss of coolant, cooling water that escapes from the break in the primary circuit collects in the sump of the safety tank.

After conclusion of the so-called "blowdown phase", the convection in the safety tank is essentially defined by the heat exchange processes t h a t o c c u r w i t h i n t h e s a f e t y t a n k (components/safety tank atmosphere), and by the heat exchange of the safety tank to the outer atmosphere.

The effect of tho heat exchange of the safety tank to the outside is that several days after the start of the breakdown, the temperature in the dome of the safety tank has become approximately 40° C.

The water that escapes from the break in the primary circuit can be adjusted in the phase of the long term cooling to about 70° C.

A sump water temperature of approximately 70° C. effects a heating of the atmosphere in the lower portion of the safety tank to temperatures that are higher than the temperatures that exist at the same time in the upper portion of the safety tank, which temperatures are approximately 40° C.

As a result, a convective intermixing of the entire safety tank atmosphere is induced, so that the feared build-up of hydrogen in portions of the safety tank can no longer occur, and right from the beginning the formation of stable atmosphere layers, especially inversion layers, cannot occur because the physical conditions that are necessary for this to occur are no longer present.

The sump temperature can be adjusted via a suitable long term aftercooler concept, via the operation of redundant aftercooler sections, and by setting appropriate temperatures at the reheating coolers.

As indicated previously, with the inventive method, to achieve the suitable sump water temperature, it is possible to utilize the secondary heat of the reactor that is continuously dissipated during the adjusted temperature level.

To enhance the exchange of the atmosphere into the individual regions of the safety tank, it is possible to dispose in the steam generator overflow hoods in the upper portion of the safety tank remotely controlled valves or flaps that if necessary can be opened in a remotely controlled manner via a suitable mechanism.

In a similar manner, doors disposed in the lower portion of the safety tank can be opened, for example by means of the fission products protection cylinder, in order to produce a large-volume convection.

The present invention is, of course, in no way restricted to the specific disclosure of the specification, but also encompasses any modifications within the scope of the appended claims.

What I claim is:

1. A method for avoiding locallized hydrogen build-ups in the atmosphere of a safety tank of a reactor, said method including the step of:

after a break-down accompanied by loss of coolant has occurred, by utilizing the secondary heat of said reactor adjusting the cooling water temperature in the sump of said safety tank in the phase of the long term cooling to a temperature that is higher than the air temperature in the dome of said safety tank so that said secondary heat used to adjust the cooling water temperature is continuously dissipated to the outside via said atmosphere in said safety tank thereby inducing a convection that effects an adequate intermixing of said atmosphere in said safety tank.

2. A method according to claim 1, in which said adjusting step includes additionally adjusting the temperature in said safety tank sump by regulating a reheating cooler.

3. A method according to claim 1, in which said adjusting step comprises adjusting water escaping from a break in a primary circuit in the phase of the long term cooling such that a water temperature in said safety tank sump of at most approximately 70° C. holds the atmosphere in a lower portion of said safety tank to temperatures that are higher than temperatures of, for example, about 40° C. that exist at the same time in an upper portion of said safety tank.

4. A method according to claim 1, wherein said adjusting step includes operating redundant aftercooler systems.

* * * * *